(12) United States Patent
Okuno et al.

(10) Patent No.: US 6,480,312 B1
(45) Date of Patent: Nov. 12, 2002

(54) DISPERSION COMPENSATING SYSTEM USED FOR BI-DIRECTIONAL OPTICAL COMMUNICATION

(75) Inventors: Toshiaki Okuno, Kanagawa (JP); Masashi Onishi, Kanagawa (JP); Masayuki Nishimura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/212,269

(22) Filed: Dec. 16, 1998

(30) Foreign Application Priority Data

Dec. 16, 1997 (JP) ............................................... 9-363477

(51) Int. Cl.⁷ ........................ H04B 10/12; H04B 10/17; H04B 10/24
(52) U.S. Cl. ........................ 359/161; 359/179; 359/114; 359/127
(58) Field of Search ................................ 359/110, 124, 359/174, 177, 179, 127, 161, 114

(56) References Cited

U.S. PATENT DOCUMENTS

| 5,392,377 A | * | 2/1995 | Auracher ..................... 359/179 |
| 5,404,413 A |  | 4/1995 | Delavaux et al. ............. 385/15 |
| 5,548,438 A | * | 8/1996 | Delavaux ................... 359/341.2 |
| 5,608,562 A |  | 3/1997 | Delavaux et al. ............ 359/161 |
| 5,633,741 A | * | 5/1997 | Giles ........................... 359/124 |
| 5,638,473 A | * | 6/1997 | Byron .......................... 385/37 |
| 5,740,297 A | * | 4/1998 | Onishi et al. ................ 385/127 |
| 5,742,416 A | * | 4/1998 | Mizrahi ....................... 359/134 |
| 5,875,054 A | * | 2/1999 | Onoda et al. ................ 359/341 |
| 5,887,091 A | * | 3/1999 | Jabr et al. ..................... 385/24 |
| 6,081,368 A | * | 6/2000 | Delavaux ..................... 359/341 |
| 6,101,016 A | * | 8/2000 | Roberts et al. .............. 359/177 |
| 6,157,477 A | * | 12/2000 | Robinson ..................... 359/161 |
| 6,195,480 B1 | * | 2/2001 | Kosaka et al. ................. 385/24 |

FOREIGN PATENT DOCUMENTS

| GB | 2304248 | * | 12/1997 |
| JP | 406342950 | * | 12/1994 |
| JP | 408054580 | * | 2/1996 |
| JP | 8-204258 |  | 8/1996 |
| JP | 8-234255 |  | 9/1996 |
| JP | 8-307347 |  | 11/1996 |

* cited by examiner

*Primary Examiner*—Leslie Pascal
(74) *Attorney, Agent, or Firm*—McDermott, Will & Emery

(57) ABSTRACT

The present invention provides a dispersion compensating system for bi-directional optical communication using wavelength division multiplexing transmission. Signal lights bi-directionally pass through a signal optical fiber which comprises a dispersion compensating fiber working bi-directionally.

19 Claims, 6 Drawing Sheets

DISPERSION COMPENSATING SYSTEM USED FOR BI-DIRECTIONAL OPTICAL COMMUNICATION

BACKGROUND OF THE INVENTION

1. Field of the Invention

The present invention relates to a dispersion compensating system used for bi-directional optical communication using wavelength division multiplexed transmission. More specifically, the present invention relates to a dispersion compensating system which reduces the required number of compensators.

2. Description of Related Art

In the field of optical communication using an optical fiber, a plurality of signal lights having different wavelengths are sometimes transmitted on a single optical transmission path, which is called wavelength division multiplexing (abbreviated as WDM hereinafter). WDM increases transmission capacity of the optical transmission path, for example, it enables bi-direction transmission for a single optical fiber. However, an optical fiber has different optical fiber has different propagation periods for different wavelength components, which result in waveform distortion. On the other hand, the wavelength dispersion has little effect on waveform in a wavelength near the zero dispersion wavelength of the optical fiber. However, it is very difficult to manufacture an optical fiber in which wavelength dispersion is substantially equal to zero for all wavelengths used in WDM.

Thus, various device and methods for compensating overall chromatic dispersion of multiplied signal lights have been published, for example, Japanese Patent Application Laid-open Nos. 7-327012, 8-307347, 8-234255, 8-204258, 7-202798, etc. However, these devices and methods substantially comprise optical fiber paths for respective propagation directions, on which dispersion compensators are arranged. An optical transmission system needs an amplifier such as an erbium doped optical fiber amplifier which essentially includes an optical isolator so that an optical fiber path is required in each direction. Thus, the conventional bi-directional communication system using WDM consists of two one-way optical fiber paths, each of which has an amplifier and a dispersion compensator.

The dispersion compensator is so expensive that the conventional bi-directional communication system using WDM becomes very expensive.

SUMMARY OF THE INVENTION

Accordingly, it is an object of the present invention to provide a bi-directional optical communication system which uses wavelength division multiplex transmission and at the same time reduces the number of dispersion compensator.

Various dispersion compensating systems that address the foregoing objects and needs as well as other objects and needs are disclosed. In one embodiment, a dispersion compensating system includes a bi-directional optical fiber path and a dispersion compensator provided on said bi-directional optical fiber path. Optical circulators/couplers are disposed on both ends of the bi-directional optical fiber path. An optical amplifier is disposed on each divisional optical fiber path connected to the optical circulators/couplers, wherein the divisional optical fiber paths are configured for uni-directional signal transmissions. The system also includes at least one supplemental dispersion compensator disposed on the divisional optical fiber paths connected to the optical circulators/couplers.

According to the invention, the dispersion compensator may be a dispersion compensating fiber having positive dispersion in signal wavelength, such as a 1.3 µm zero-dispersion single mode fiber.

The dispersion compensator may also be a dispersion compensated fiber having a negative dispersion in signal wavelength, such as a double clad type fiber.

According to still another aspect of the invention, there is provided a bi-directional optical communication system using wavelength division multiplex transmission comprising at least one optical path formed of a single optical fiber wherein signal lights bi-directionally pass through the single optical fiber and the single optical fiber comprises a dispersion compensating fiber.

In another embodiment, a dispersion compensating system comprises a first optical fiber path for bi-directional transmission and a first 3-port coupler connected to the first optical fiber path. A second optical fiber path is provided for transmission in a first direction connected between the first 3-port coupler and a second 3-port coupler, and a third optical fiber path is provided for bi-directional transmission connected between the second 3-port coupler and a third 3-port coupler. The dispersion compensating system further includes a fourth optical fiber path for transmission in the first direction connected between the third 3-port coupler and a fourth 3-port coupler, and a fifth optical fiber path for bi-directional transmission connected to the fourth 3-port coupler. A sixth optical fiber path is provided for transmission in a second direction connected between the first 3-port coupler and the second 3-port coupler, and a seventh optical fiber path is provided for transmission in the second direction connected between the third 3-port coupler and the fourth 3-port coupler. The optical amplifiers are provided on the second, fourth, sixth and seventh optical fiber paths. Optionally, a dispersion compensator is provided on the third optical fiber path. At least one supplemental dispersion compensator is disposed on the second, the fourth, the sixth or the seventh optical fiber path.

According to still another aspect of the invention, there is provided a bi-directional optical communication system using wavelength division multiplex transmission comprising at least one optical path formed of a single optical fiber wherein signal lights bi-directionally pass through the single optical fiber and the single optical fiber comprises a dispersion compensated fiber.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
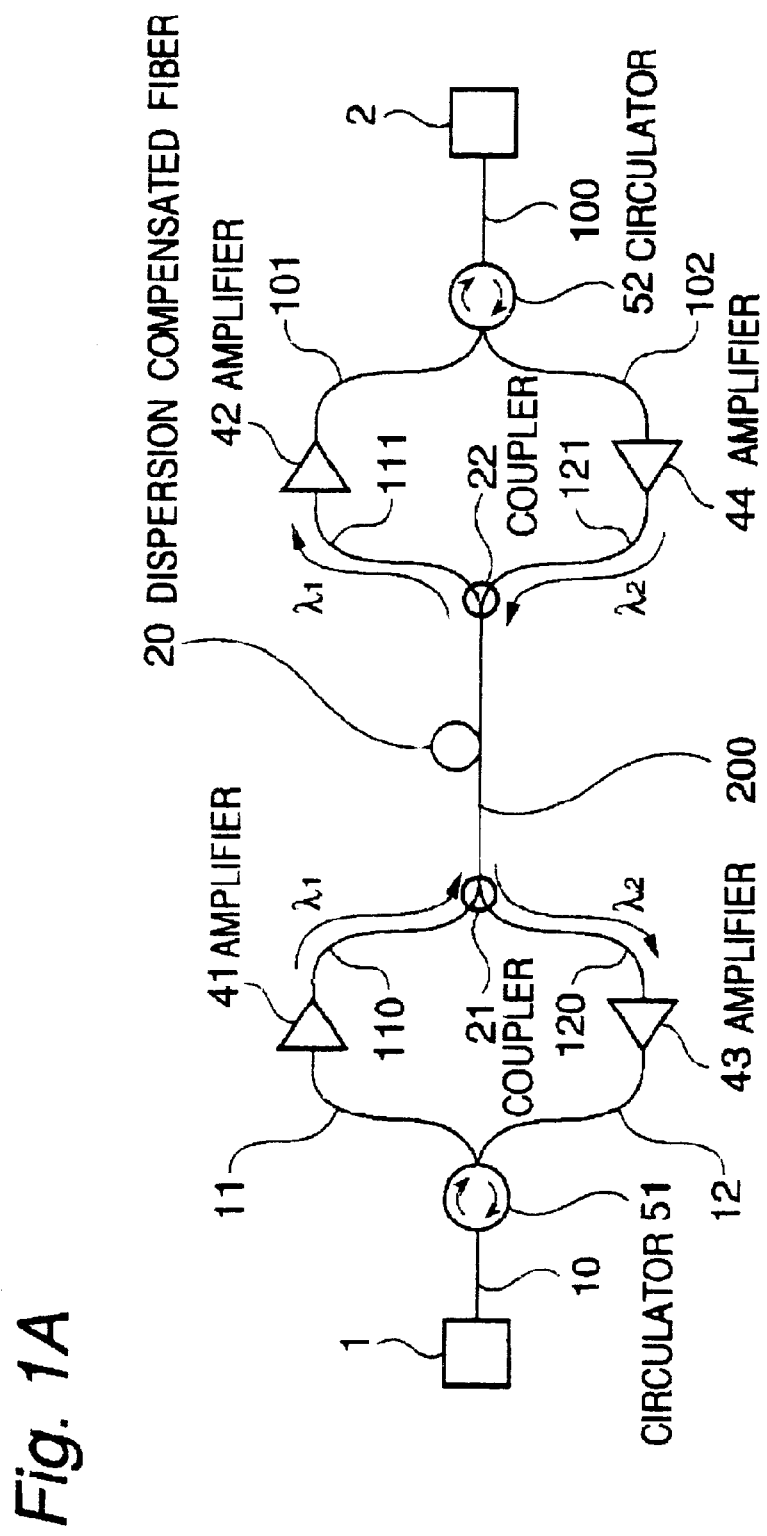
FIGS. 1A to 1E show embodiments of the optical communication system using the dispersion compensating system according to the invention.

Referring to FIG. 1A, there is shown a schematic view of an embodiment of the optical communication system using the dispersion compensating system according to the invention. The optical communication system shown in FIG. 1A comprises a first and second optical transceivers 1 and 2, between which bi-directional transmission is carried out with signal lights having wavelengths $\lambda_1$ and $\lambda_2$ through a single optical fiber path 200. The single optical fiber path 200 is substantially formed of a single optical fiber through which the signal lights having wavelengths $\lambda_1$ and $\lambda_2$ pass bi-directionally. In general, the signal lights of 1.5 μm band are used, particularly wavelength $\lambda_1$ has a signal band of 1525–1545 nanometers and $\lambda_2$ has a signal band of 1545–1565 nanometers.

An input/output port of the first optical transceiver 1 is connected to one end of an optical fiber 10, and the other end of which is connected to a first port of 3-port optical circulator 51. A second port of the optical circulator 51 is connected to an optical fiber 11 which is connected to an input of an amplifier 41. A third port of the optical circulator 51 is connected to an optical fiber 12 which is connected to an output of an amplifier 43. An output of the amplifier 41 is connected to an optical fiber path 200 through an optical fiber 110 and a 3-port wavelength selective coupler 21. An input of the amplifier 43 is also connected to one end of an optical fiber path 200 through an optical fiber 120 and a 3-port wavelength selective coupler 21.

The optical fiber path 200 comprises a dispersion compensating fiber 20 at its middle to compensate cumulative wavelength dispersion of the signal lights. The other end of the optical fiber path 200 is connected to optical fibers 111 and 121 through a 3-port wavelength selective coupler 22. The optical fiber 111 is connected to an input of an amplifier 42 whose output is connected to a third port of a 3-port optical circulator 52 through an optical fiber 101. The optical fiber 121 is connected to an output of an amplifier 44 whose input is connected to a second port of the 3-port optical circulator 52 through an optical fiber 102. A first port of the 3-port optical circulator 52 is connected to an input/output port of a second optical transceiver 2 through an optical fiber 100.

The amplifiers 41–44, such as an rare earth doped optical fiber amplifier, essentially include optical isolators so that they cannot be used bi-directionally. Thus, the amplifiers 41–44 are arranged on optical paths between the circulator 51 and the coupler 21 and between the circulator 52 and the coupler 22, through which signal lights propagate in one direction.

Figure 3:
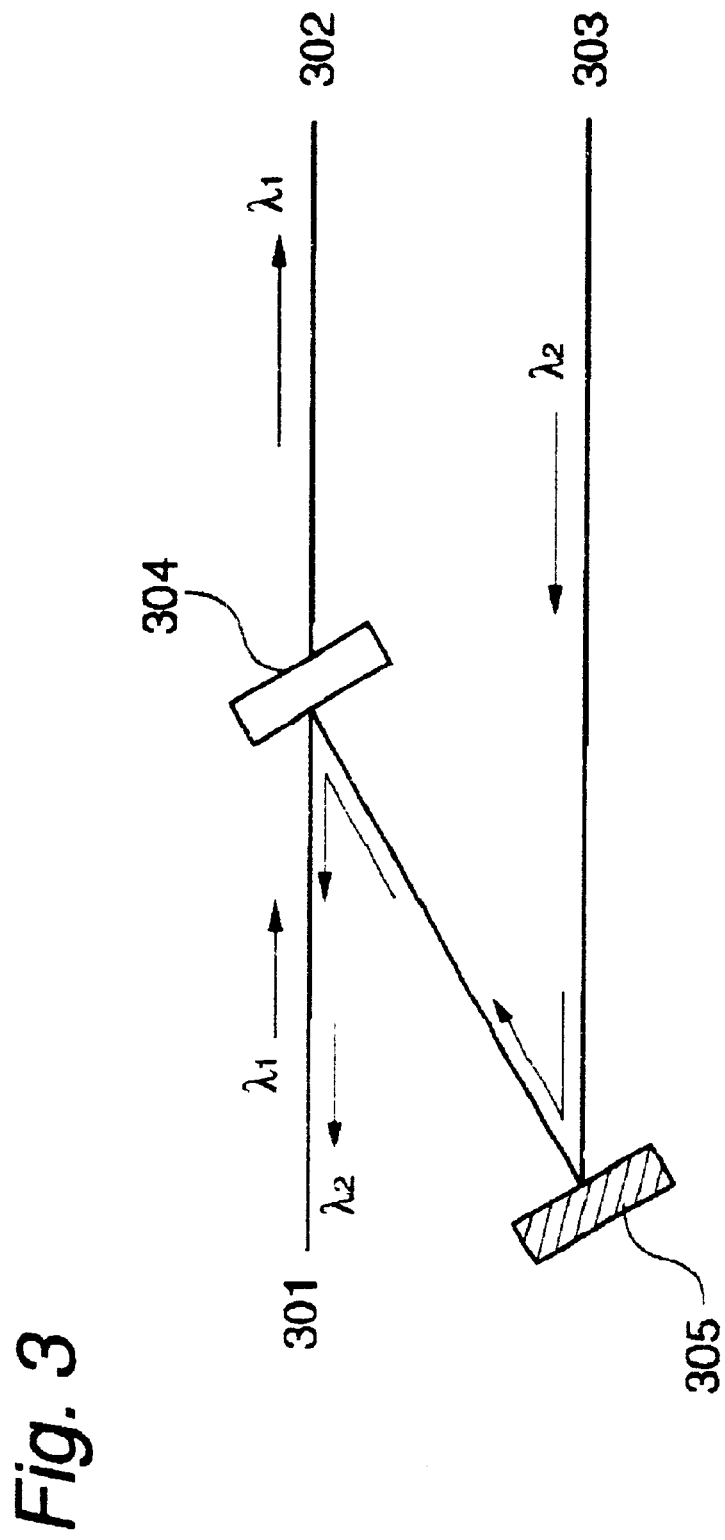
FIG. 3 shows an embodiment of the wavelength selective coupler used in the optical communication system using the dispersion compensating system according to the present invention.

The 3-port wavelength selective coupler is a special coupler in which a light having a wavelength of 1 passes from a first port to a second port and a light having a wavelength of 2 passes from a third port to a first port. FIG. 3 shows a schematic view of an embodiment of the 3-port wavelength selective coupler. The 3-port wavelength selective coupler shown in FIG. 3 comprises a dielectric multilayer filter 304 arranged on an optical path between a first and second ports 301 and 302, and a total reflecting mirror 305 arranged on an optical path from a third port 303. The dielectric multilayer filter 304 is configured so that a light having a wavelength of 1 passes through it and it reflects a light having a wavelength of 2. Thus, a light having a wavelength of 1 entering from the first port 301 passes through the dielectric multilayer filter 304 to the second port 302. A light having a wavelength of 2 and entering from the third port 303 is reflected by the mirror 305 and the dielectric multilayer filter 304 to the first port 301. This type of wavelength selective coupler is less expensive than the optical circulator. However, it is unable to change the wavelength pass configuration. Therefore, if the optical communication system is permanently unchanged, this type of wavelength selective coupler can be advantageously used to reduce the cost.

In the optical communication system shown in FIG. 1A, a signal light having a wavelength of 1 emitted by the optical transceiver 1 propagates through the optical fibers 10 and 11 to the amplifier 41. The amplified signal light is transmitted to the optical fiber path 200 through the optical fiber 110 and the coupler 21. Cumulative wavelength dispersion of the signal light of a wavelength of 1 is compensated by the dispersion compensating fiber 20 and transmitted through the coupler 22 and the optical fiber 111 to the amplifier 42. The signal light is again amplified and is transmitted through the optical fiber 101, the optical circulator 52 and the optical fiber 100 to the optical transceiver 2.

Conversely, a signal light having a wavelength of 2 emitted by the optical transceiver 2 propagates through the optical fibers 100 and 102 to the amplifier 44. The, amplified signal fight is transmitted to the optical fiber path 200 through the optical fiber 121 and the coupler 22. Cumulative wavelength dispersion of the signal light of a wavelength of 2 is compensated by the dispersion compensating fiber 20 and transmitted through the coupler 21 and the optical fiber 120 to the amplifier 43. The signal light is again amplified and is transmitted through the optical fiber 12, the optical circulator 51 and the optical fiber 10 to the optical transceiver 1.

The dispersion compensating fiber 20 comprises a 1.3 μm no-dispersion single mode fiber having a positive dispersion. When a dispersion shifted optical fiber having a dispersion at 1.55 μm band of −2 ps/nm/km is used for the optical fiber path, the dispersion compensating fiber may be a matched type having a propagation loss at 1.55 μm band of 0.2 dB/kilometers and dispersion at 1.55 μm band of +17 ps/nm/km.

This dispersion compensating fiber compensates both of the signal light having a wavelength of 1 and transmitted from the optical transceiver 1 to the optical transceiver 2 and the signal light having a wavelength of 2 from the optical transceiver 2 to the optical transceiver 1. However, due to its positive dispersion characteristics, it is very difficult to carry out complete compensation on both of the signal lights having a wavelength of 1 and 2 by the single dispersion compensating fiber. In order to supplement compensation, an adjusting dispersion compensating fiber may be additionally arranged on an optical fiber path between the coupler and circulator.

FIGS. 1B to 1E show embodiments of the optical communication system using the dispersion compensating system according to the invention comprising two adjusting dispersion compensating fibers. The optical communication systems shown in FIGS. 1B to 1E have the same configuration as that of FIG. 1A excluding adjusting dispersion compensating fibers 61 and 62. Therefore, the explanations will be contracted for the common configurations in the following descriptions.

Figure 1B:
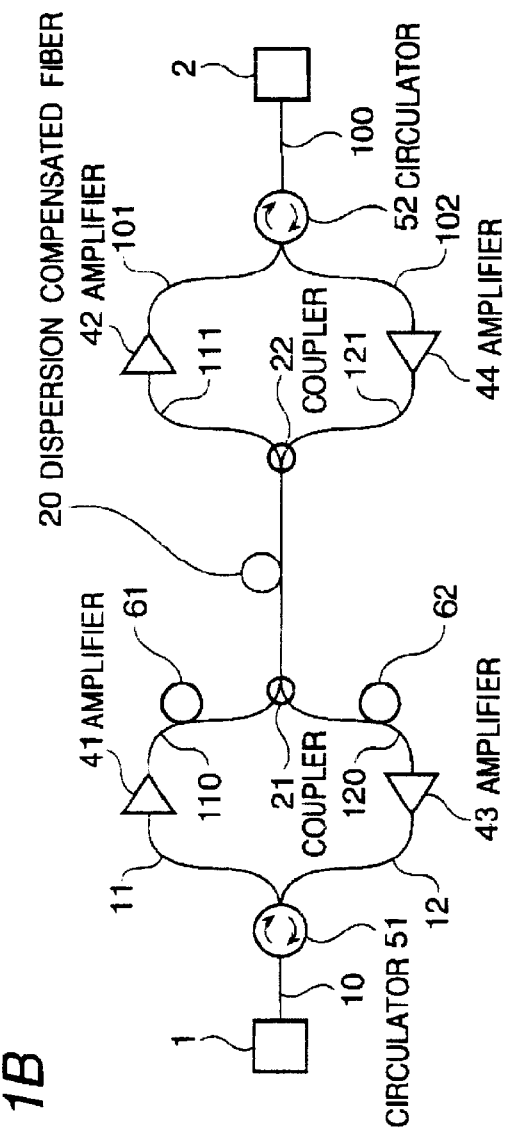

The optical communication system shown in FIG. 1B comprises an adjusting dispersion compensating fiber 61 provided on the optical fiber path 110 and an adjusting dispersion compensating fiber 62 provided on the optical fiber path 120. The adjusting dispersion compensating fiber 61 compensate remained dispersion of the signal light having a wavelength of 1 and the adjusting dispersion compensating fiber 62 compensate remained dispersion of the signal light having a wavelength of 2. Of course, most of dispersion of the signal lights are compensated by the dispersion compensating fiber 20 so that the amount of remained dispersion to be compensated by the adjusting dispersion compensating fibers 61 and 62 is a little. Thus, the adjusting dispersion compensating fibers 61 and 62 can be far shorter than the dispersion compensating fiber 20. Therefore, even the adjusting dispersion compensating fibers 61 and 62 are provided, the optical communication system can reduce its cost compared to the conventional system having a dispersion compensating fiber in each propagation direction. The two adjusting dispersion compensating fibers 61 and 62 are not always necessary. If dispersion of one of the signal lights is sufficiently compensated by the dispersion compensating fiber 20, it is possible to dispose only one adjusting dispersion compensating fiber to compensate remained dispersion of the other signal light.

Figure 1C:
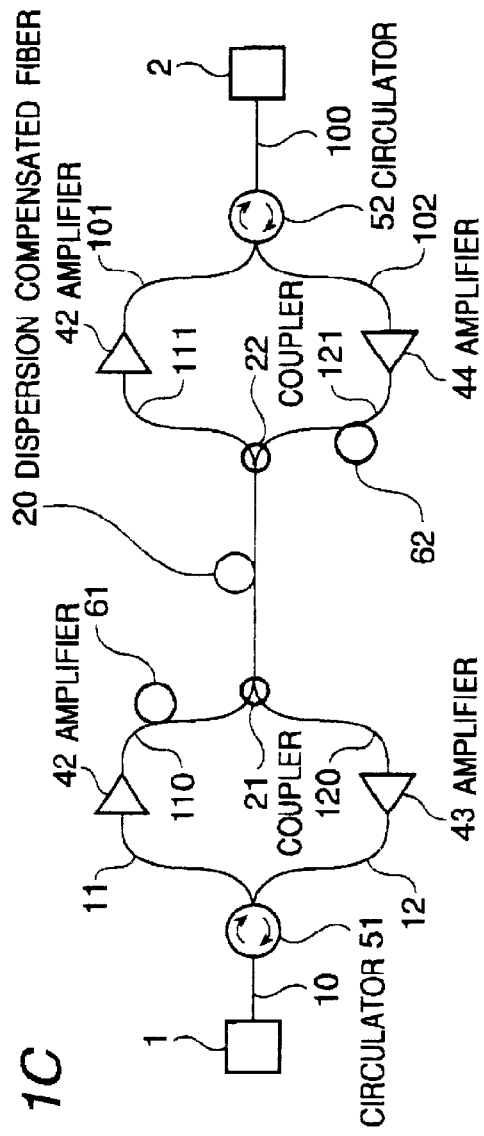
Figure 1D:
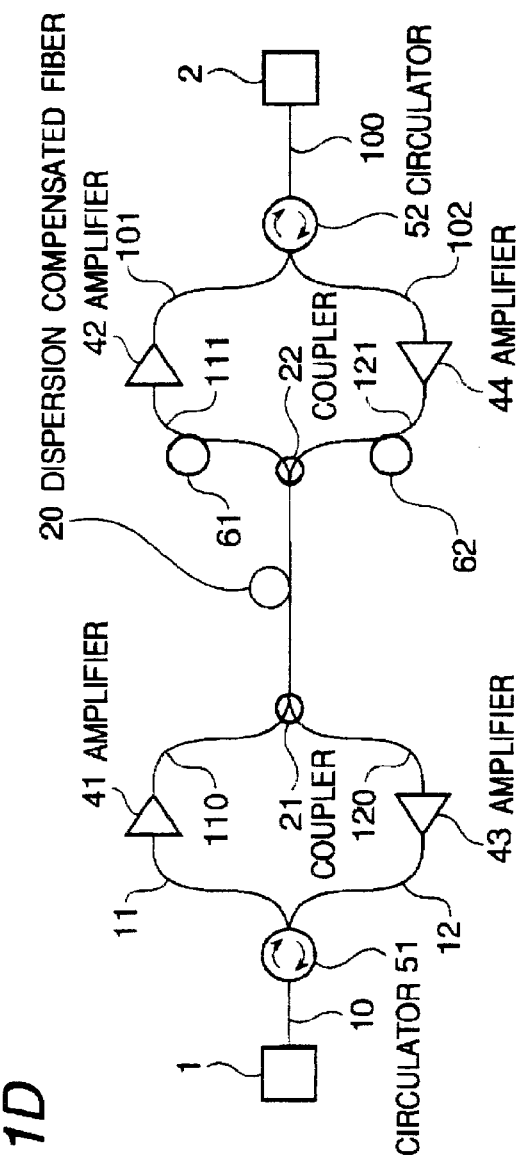
Figure 1E:
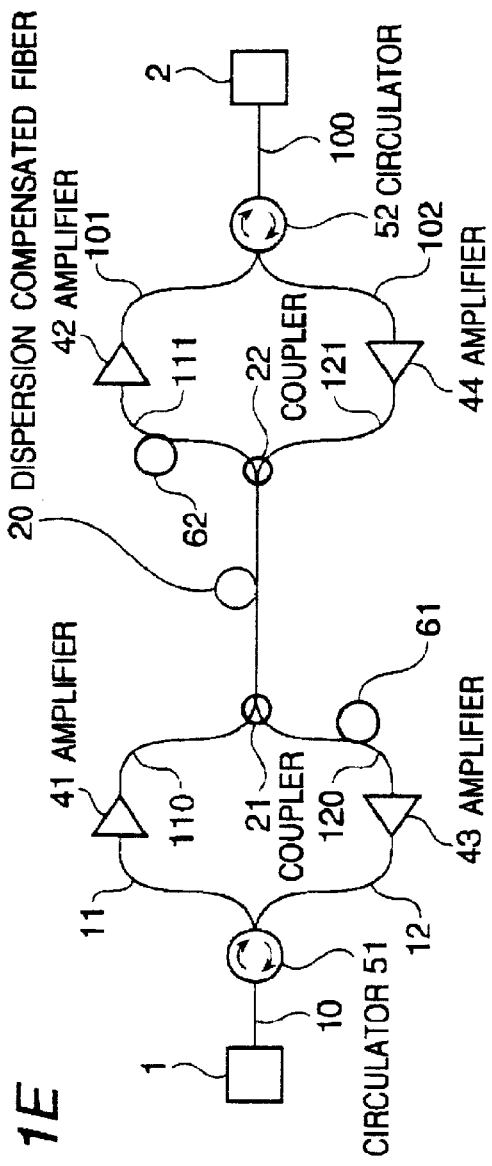

The adjusting dispersion compensating fibers 61 and 62 can be inserted to other optical fiber paths. FIGS. 1C–1E show variations which comprises adjusting dispersion compensating fibers 61 and 62 inserted to optical fiber paths other than the optical fiber paths 110 and 120.

Figure 2A:
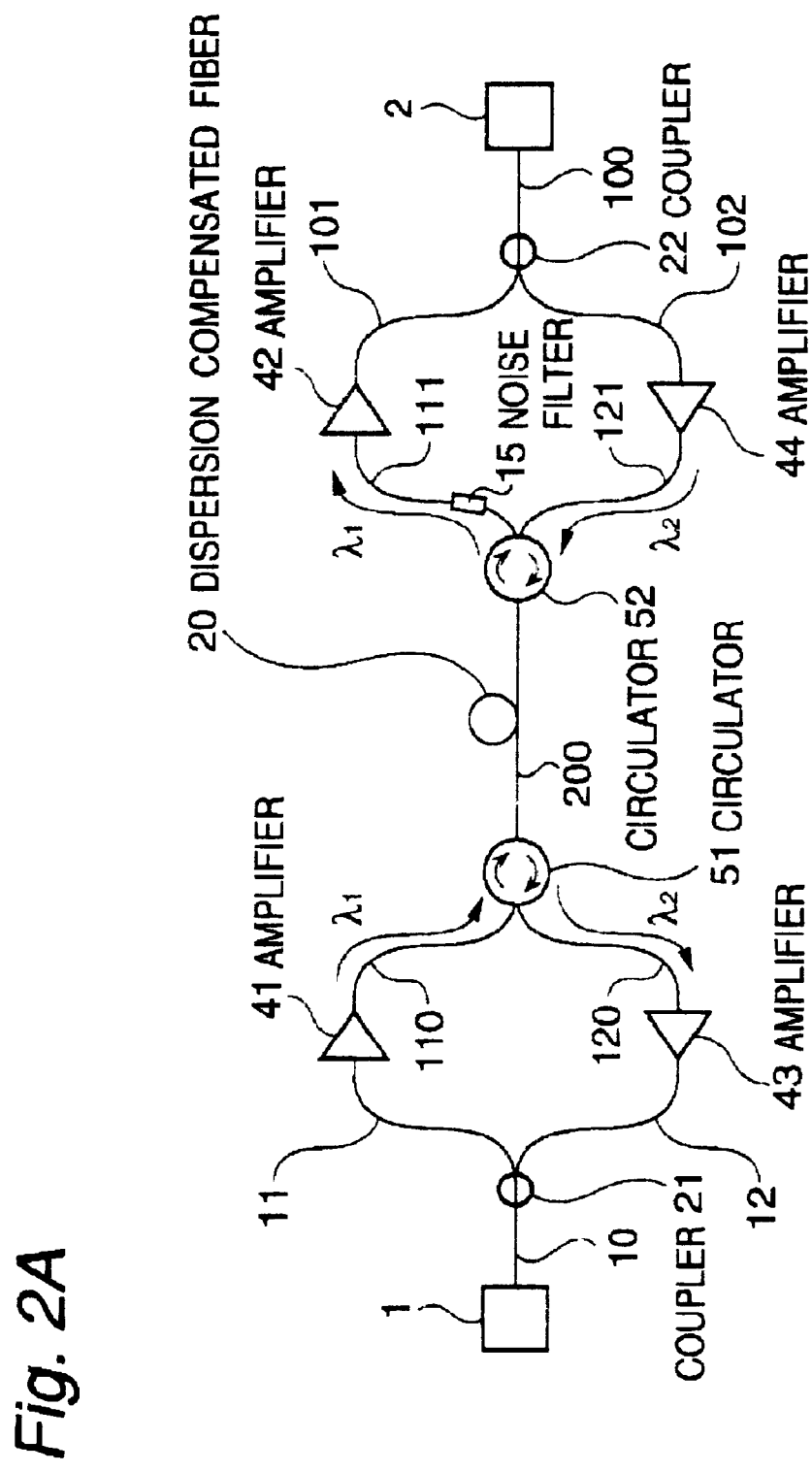
FIGS. 2A and 2B show variations of the optical communication system using the dispersion compensating system according to the invention.
Figure 2B:
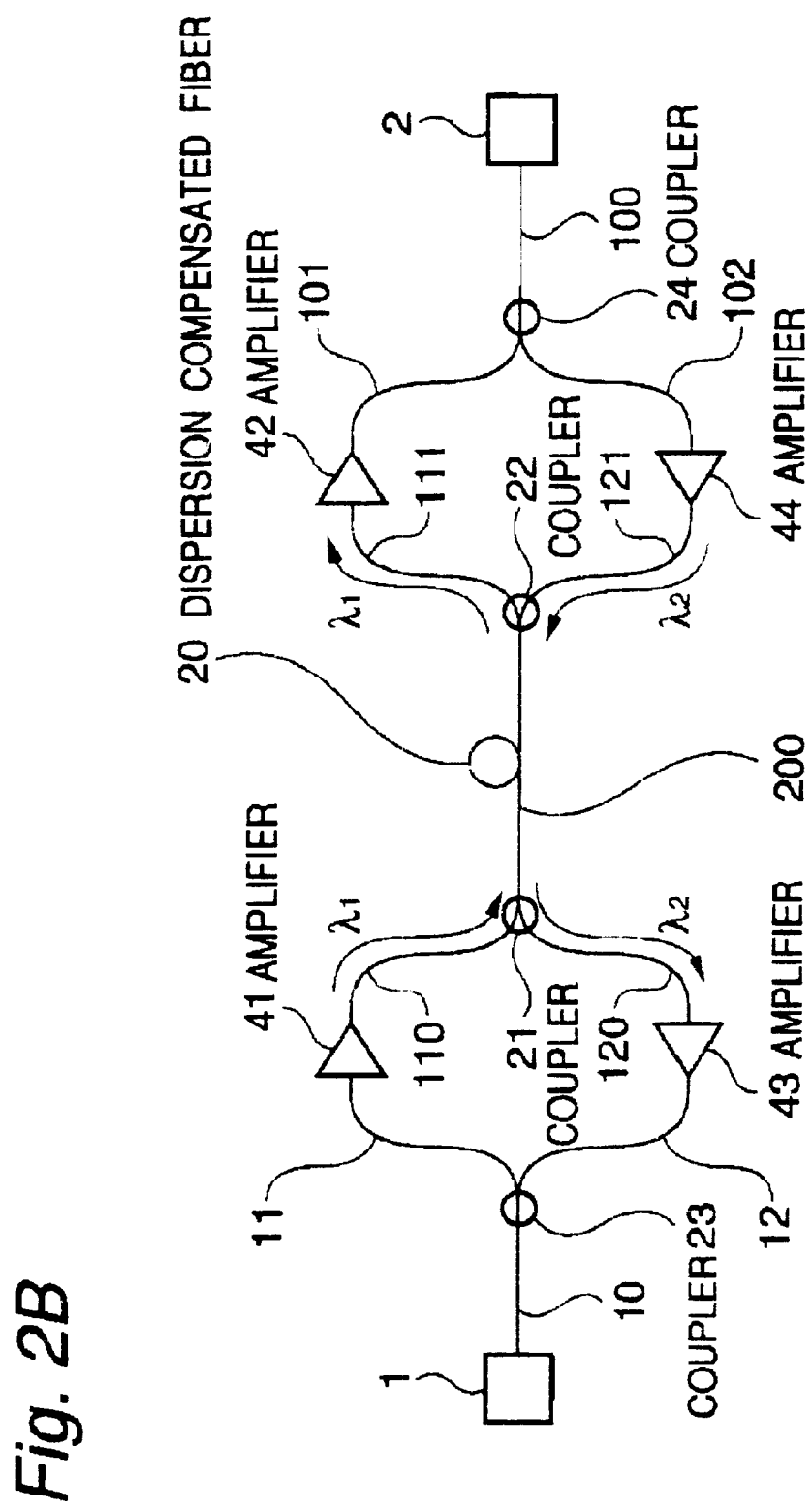

FIGS. 2A and 2B show other variations of the optical communication system using the dispersion compensating system according to the invention. The couplers 21 and 22 and circulators 51 and 52 of optical communication system shown in FIG. 2A are replaced with each other compared to the optical communication system of FIG. 1A. In addition, the dispersion compensating fiber 20 comprises a double clad type dispersion compensating fiber having a negative dispersion. When a single mode optical fiber having a dispersion at 1.55 µm band of +17 ps/nm/km is used for the optical fiber path, the dispersion compensating fiber may be a double clad type having a propagation loss at 1.55 µm band of 0.5 dB/kilometers and dispersion at 1.55 µm band of −100 ps/m/km. For example, the wavelength 1 may be equal to 1538 nanometers and 2 may be equal to 1552 nanometers.

This dispersion compensating fiber compensates both of the signal light having a wavelength of 1 and transmitted from the optical transceiver 1 to the optical transceiver 2 and the signal light having a wavelength of 2 from the optical transceiver 2 to the optical transceiver 1. Due to its negative dispersion characteristics, it is possible to carry out almost complete compensation on both of the signal lights having a wavelength of 1 and 2 by the single dispersion compensating fiber. Therefore, in this case, an adjusting dispersion compensating fiber is not necessary.

However, the double clad type dispersion compensating fiber has a larger propagation loss for a shorter wavelength. Therefore, in the optical communication system shown in FIG. 2, the amplifier 42, downstream side of the dispersion compensating fiber 20, has a larger gain than other amplifiers. In this case, it is not recommended to increase gain of the amplifier 41, on the upstream side of the dispersion compensating fiber 20. Because, it has high linearity. In order to improve quality of transmission, a noise filter 15 can be inserted to the optical fiber path 111, at the downstream side of the dispersion compensating fiber 20, to utilize larger gain of the amplifier 41.

FIG. 2B shows still another variation of the optical communication system using the dispersion compensating system according to the invention. The circulators 51 and 52 of optical communication system shown in FIG. 2A are replaced with couplers 23 and 24 compared to the optical communication system of FIG. 1A. This constitution is advantageous for a permanently fixed optical communication system because the 3-port wavelength selective coupler is less expensive and has insertion loss lower than the optical circulator, although its wavelength pass configuration cannot be easily changed.

However, if the constitution of the optical communication system is not fixed and often changed, it is preferable to use optical circulators instead of the 3-port wavelength selective coupler.

The invention has thus been shown and described with reference to the specific embodiments. However, it should be noted that the present invention is in no way limited to the details of the illustrated structures. Changes and modifications may be made within the scope of the claims. For example, the number of the multiplexed signal lights is not limited to two. The invention can be applied to an optical communication system utilizing wavelength division multiplex transmission using three or more signal lights. Additionally, the dispersion compensator is not limited to a dispersion compensated compensating fiber. Any dispersion compensator such as a single mode fiber, a double clad type fiber, fiber grating type etc. may be used so long as it can be used bi-directionally.

The entire disclosure of Japanese Patent Application No. 9-363477 filed on Dec. 16, 1997 including specifications, claims, drawings and summaries are incorporated herein by reference in their entireties.

What is claimed is:

1. A dispersion compensating system used for bidirectional optical communication system using wavelength division multiplex transmission comprising:

a bi-directional optical fiber path;

a dispersion compensator provided on said bidirectional optical fiber path;

optical circulators/couplers disposed on both ends of said bidirectional optical fiber path;

an optical amplifier disposed on each divisional optical fiber path connected to said optical circulators/couplers, wherein the divisional optical fiber paths are configured for uni-directional signal transmissions; and at least one supplemental dispersion compensator disposed on the divisional optical fiber paths connected to said optical circulators/couplers.

2. A system as claimed in claim 1, wherein the dispersion compensator is a dispersion compensated compensating fiber and has a positive dispersion in the signal wavelength.

3. A system as claimed in claim 2, wherein the dispersion compensated compensating fiber comprises a 1.3 µm zero-dispersion signal mode fiber.

4. A system as claimed in claim 1, wherein the dispersion compensator is a dispersion compensated compensating fiber and has a negative dispersion in the signal wavelength.

5. A system as claimed in claim 4, wherein the dispersion compensated compensating fiber comprises a double clad type dispersion compensated compensating fiber.

6. The system as claimed in claim 4, wherein at least one noise filter is provided on at least one of the divisional optical fiber paths downstream to the dispersion compensating fiber in a direction of signal flow.

7. The system as claimed in claim 1, wherein the dispersion compensator is a dispersion compensating fiber.

8. A dispersion compensating system comprising:

a first optical fiber path for bi-directional transmission;

a first 3-port coupler connected to the first optical fiber path;

a second optical fiber path for transmission in a first direction connected between the first 3-port coupler and a second 3-port coupler;

a third optical fiber path for bi-directional transmission connected between the second 3-port coupler and a third 3-port coupler;

a fourth optical fiber path for transmission in the first direction connected between the third 3-port coupler and a fourth 3-port coupler;

a fifth optical fiber path for bi-directional transmission connected to the fourth 3-port coupler;

a sixth optical fiber path for transmission in a second direction connected between the first 3-port coupler and the second 3-port coupler; and a seventh optical fiber path for transmission in the second direction connected between the third 3-port coupler and the fourth 3-port coupler wherein optical amplifiers are provided on the second, fourth, sixth and seventh optical fiber paths, a dispersion compensator is provided on the third optical fiber path, and at least one supplemental dispersion compensator is disposed on the second, the fourth, the sixth or the seventh optical fiber path.

9. A system as claimed in claim 8, wherein at least one of the 3-port coupler 3 is a 3-port wavelength selective coupler.

10. A system as claimed in claim 8, wherein at least one of the 3-port couplers is a 3-port optical circulator.

11. The system as claimed in claim 8, wherein the at least one supplemental dispersion compensator includes a first supplemental compensator and a second supplemental compensator disposed on different fiber path respectively.

12. The system as claimed in claim 11, wherein the first and the second supplemental dispersion compensators compensate signals having different wavelengths respectively.

13. The system as claimed in claim 8, wherein the at least one supplemental dispersion compensator is used to compensate residual dispersions that are not removed by the dispersion compensator provided on the third optical fiber path.

14. The system as claimed in claim 8, wherein the dispersion compensator is a dispersion compensating fiber.

15. A bi-directional optical communication system comprising:

a first optical fiber path for bi-directional transmission;

a first 3-port coupler connected to the first optical fiber path;

a second optical fiber path for transmission in a first direction connected between the first 3-port coupler and a second 3-port coupler;

a third optical fiber path for bi-directional transmission connected between the second 3-port coupler and a third 3-port coupler;

a fourth optical fiber path for transmission in the first direction connected between the third 3-port coupler and a fourth 3-port coupler;

a fifth optical fiber path for bi-directional transmission connected to the fourth 3-port coupler;

a sixth optical fiber path for transmission in a second direction connected between the first 3-port coupler and the second 3-port coupler; and a seventh optical fiber path for transmission in the second direction connected between the third 3-port coupler and the fourth 3-port coupler wherein optical amplifiers are provided on the second, fourth, sixth and seventh optical fiber paths, a dispersion compensator is provided on the third optical fiber path, and at least one supplemental dispersion compensator is disposed on the second, the fourth, the sixth or the seventh optical fiber path.

16. A system as claimed in claim 15, wherein at least one of the 3-port couplers is a 3-port wavelength selective coupler.

17. A system as claimed in claim 15, wherein at least of the one 3-port optical circulator.

18. The system of claim 15, wherein the dispersion compensator is a dispersion compensating fiber.

19. The system of claim 15, wherein the at least one supplemental dispersion compensator includes a first supplemental dispersion compensator and a second supplemental dispersion compensator disposed on different fiber path respectively.

* * * * *